P. WEISS.
MANUFACTURE OF MOLDINGS.
APPLICATION FILED JUNE 14, 1909.
966,372.
Patented Aug. 2, 1910.
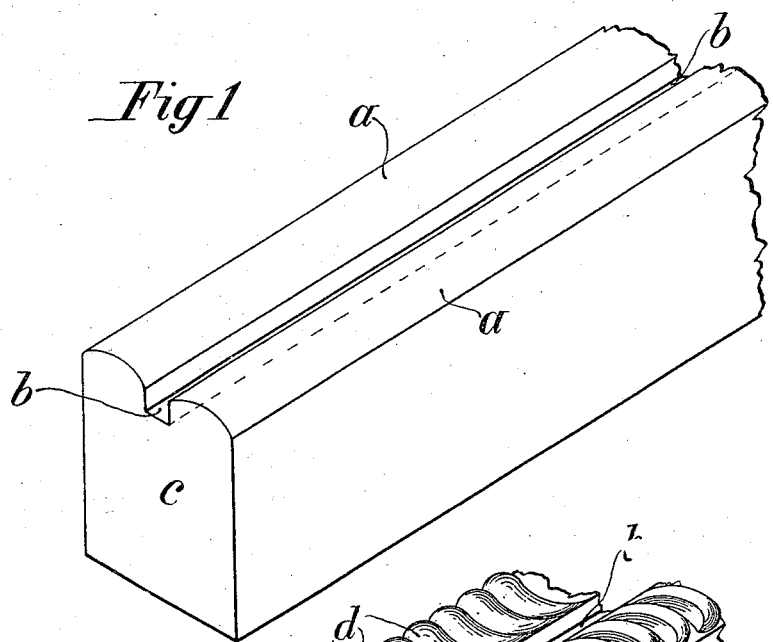
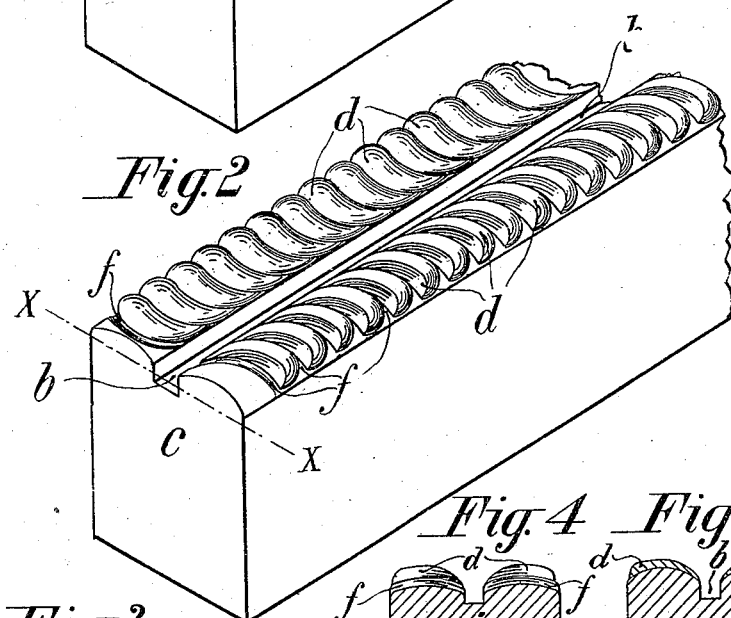
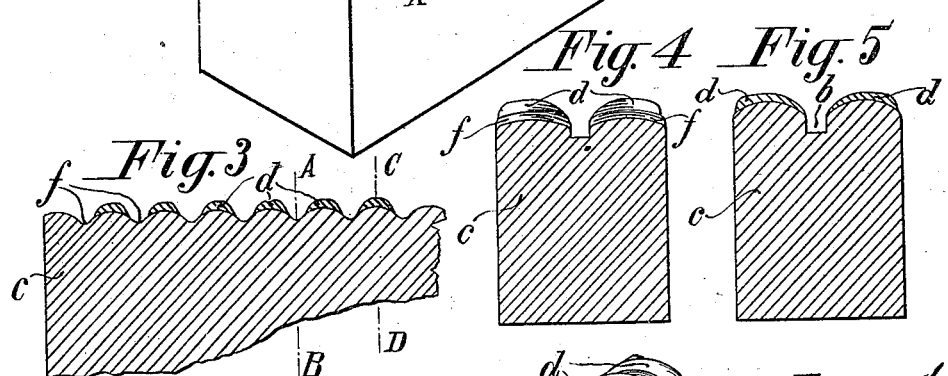
Witnesses.
Inventor:
Philip Weiss.
By James L. Norris
Atty.

UNITED STATES PATENT OFFICE.

PHILIP WEISS, OF VIENNA, AUSTRIA-HUNGARY.

MANUFACTURE OF MOLDINGS.

966,372.  Specification of Letters Patent.  Patented Aug. 2, 1910.

Application filed June 14, 1909. Serial No. 502,325.

*To all whom it may concern:*

Be it known that I, PHILIP WEISS, subject of the Emperor of Austria-Hungary, residing at Vienna, Austria-Hungary, have invented certain new and useful Improvements in and Relating to the Manufacture of Moldings, of which the following is a specification.

It is known in the picture and mirror framing industry to form ornamental moldings by covering wooden strips with plastic materials and then to form designs by pressure with engraved rollers.

This invention has for its object a process by means of which the manufacture of the moldings is simplified and by which the plastic material is so formed that even when roughly treated it will not separate from the wood. By reason of this the process is suitable for very fine work and it has been found also that moldings manufactured in this manner last much longer than those constructed by the known methods.

This improved process consists broadly in the fact that the preliminary roughly molded wooden strip together with its covering layer of plastic material is pressed by means of an engraved roller in such a manner that only the ornamental portions in high relief are covered with a thin layer of the mass while the deeper ornamental parts are pressed directly in the wood.

The accompanying drawing serves to illustrate by way of example the method of carrying into practice the process forming the subject matter of the present invention.

Figure 1 is a perspective view of a roughly fashioned wooden fillet from which the ornamental moldings may be obtained for example in pairs. Fig. 2 is likewise a perspective view of the wooden fillet provided with the ornamental moldings. Fig. 3 is a vertical longitudinal section through the middle of one of the ornamental moldings and the wooden fillet shown in Fig. 2. Figs. 4 and 5 are vertical cross sections on the lines A—B and C—D respectively in Fig. 3. Fig. 6 is a perspective view of a finished molding after it has been severed from the wooden fillet.

The wooden fillet *c* which has been roughly fashioned and provided for example with two longitudinal protuberances *a a* with a channel or groove *b* between them (Fig. 1) is softened on its surface or on the longitudinal protuberances *a a* by means of hot water or in some other suitable manner. The wooden fillet and a flat layer of a plastic mass is then subjected to strong pressure by means of an engraved roller beneath which the wooden fillet and the plastic mass are conducted together in such a manner that the parts of the molding most in relief (the parts *d* in Figs. 2–5) consist entirely of the plastic mass while the intaglio parts of the ornamentation (the parts *f* in Figs. 2–5) are impressed in the wood owing to the fact that the vigorous pressure of the engraved roller exerted through the plastic mass on the wood of the longitudinal protuberances forces the plastic mass out of the deeper places in the ornamentation and condenses or concentrates it at the places in higher relief. In this manner only very small short parts are covered with the plastic mass which is constantly interrupted by the deep impression in the wood. Owing to the fact that the small parts of the ornamentation covered with the mass are separated one from the other by wood portions and that the roller exerts so vigorous a pressure that the indentation in the parts in lower relief is also formed in the wood, the combination of the wood and the plastic mass is so intimate that even when the mold is roughly used the mass will not crack or separate from the wood. After the longitudinal protuberances have been ornamented or molded and gilded or provided in some other manner with a coat of paint or the like, they are separated from the wooden fillet *c* by means of circular or band saws by means of a cut formed approximately at the height indicated by the line X—X in Fig. 2, thereby forming two separate ornamental moldings *g*, Fig. 6, which are very flexible, while on the other hand the plastic mass forming the part of the decoration in relief is not liable to crack or break away. The rest of the wooden fillet may be again fashioned and treated in the manner already described so that a large number of moldings can be obtained from a wooden fillet with very little waste.

Moldings of this kind may be formed in any desired lengths and glued or nailed upon the smooth picture or mirror frames that are to be ornamented so that they completely resemble carved moldings formed on the frame itself by the carver. Owing to the fact that the plastic mass is pressed only on to the higher parts of the ornamentation the latter has a much more prominent appearance and owing to the smoothness of the projecting parts on to which the mass has been pressed extremely fine work may be put upon the molding later, if desired. These ornamental moldings are likewise suitable for the decoration of rooms, for furniture, and so forth.

Having fully described my invention, I claim:

A process for forming ornamental molding which consists in imposing a layer of plastic material upon a strip of wood to form a molding blank and in forming a design in relief and intaglio upon the surface of the blank in a manner to concentrate the plastic material to form the relief portions of the design and to press the intaglio portions of the design into the strip of wood, thus producing a molding having wood faced intaglio portions intervening between plastic faced relief portions.

In testimony whereof I have hereunto set my hand in presence of two subscribing witnesses.

PHILIP WEISS.

Witnesses:
 JOSEF RUBASCH,
 ROBERT W. HEINGARTNEY.